Figure 1:
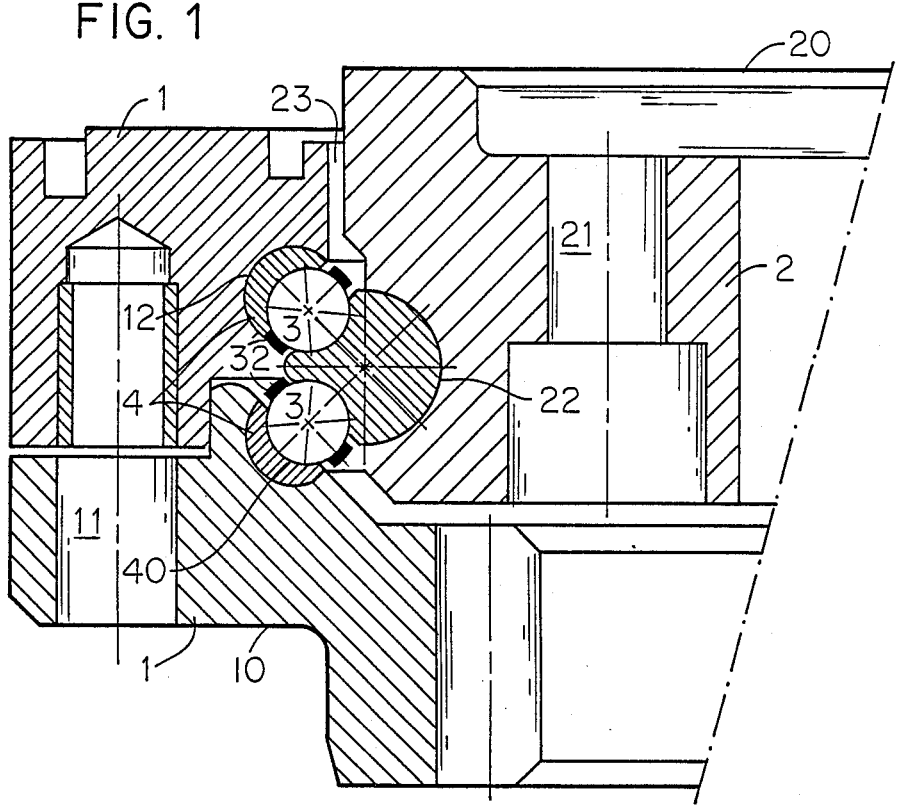

United States Patent [19]

Jacob et al.

[11] Patent Number: 4,778,287
[45] Date of Patent: Oct. 18, 1988

[54] ANNULAR MULTI-ROW BEARING WITH SHAPED-WIRE RACES

[75] Inventors: Werner Jacob, Frankfurt am Main; Horst F. Götze, Bodelshausen, both of Fed. Rep. of Germany

[73] Assignee: Hoesch Aktiengesellschaft, Dortmund, Fed. Rep. of Germany

[21] Appl. No.: 43,183

[22] Filed: Apr. 27, 1987

[30] Foreign Application Priority Data

Apr. 28, 1986 [DE] Fed. Rep. of Germany ....... 3613390

[51] Int. Cl.$^4$ .............................................. F16C 19/10
[52] U.S. Cl. ...................... 384/613; 384/501; 384/612; 384/615
[58] Field of Search ............... 384/615, 504, 613, 612, 384/501, 622

[56] References Cited

U.S. PATENT DOCUMENTS 1,121,208 12/1914 Sultemeyer ................. 384/504
3,030,158 4/1962 Pohler ....................... 384/615
4,400,042 8/1983 Fritz ......................... 384/615

Primary Examiner—Lenard A. Footland
Attorney, Agent, or Firm—Max Fogiel

[57] ABSTRACT

The invention concerns an annular multi-row bearing with shaped-wire races with an inner and an outer race, each of which constitutes part of the tracks for the rolling components, and with rolling components accommodated between them. The particular object is, in addition to others, to create a bearing that, although stable, is resilient enough when transverse forces occur to allow both races to twist in relation to each other within certain limits, avoiding stress.

The invention attains this in that the contact or rolling surfaces between the races and the rolling components are provided with a contour that deviates from the rectilinear and mutually surrounds itself and in that these contact surfaces are shaped and/or positioned such that there is a four-point bearing in each track.

This principle can be embodied with either ball bearings or roller bearings, whereby only three shaped wires are preferably employed. The angles of support range, depending on the type of bearing, between approximately 30° and approximately 90°.

12 Claims, 2 Drawing Sheets

U.S. Patent  Oct. 18, 1988  Sheet 1 of 2  4,778,287

ANNULAR MULTI-ROW BEARING WITH SHAPED-WIRE RACES

The invention concerns an annular multi-row bearing with shaped-wire races for accommodating axial, radial, and momental forces and comprising an inner and an outer race that have tracks for rolling components and that consist of of one or more but generally of at least three shaped wires.

Bearings of this type are as is known subject to especially complex demands. They cannot weigh too much, which is already a problem in bearings with a diameter of several meters. Since the potential speed of armored vehicles in particular is limited with reference to both the engine and the undercarriage by the armor plate on the undercarriage and turret, weight must be saved not only in the bearing but also in the undercarriage and other components.

This leads to the undercarriage and chassis in such vehicles not being as resistant to torque as is actually necessary. This weakness on the part of the vehicle, however, also entails as a side-effect the advantage that the joints are not so powerfully stressed as in the case of more rigid undercarriages.

The low resistance to torque, however, is deleterious to the wire-race bearing in that, since the vehicle bends three-dimensionally in the field, with the turret following slightly later through the intermediary of the bearing, stresses that can be considerable occur in the bearing. If the weapon is simultaneously being fired, forces that equal a multiple of the load will be added to the bearing.

These stresses, however, also occur in bearings of this type that are employed with stationary systems when they are subjected to horizontal vibrations or changes in position and load for example.

The object of the invention is to improve the ratio between the size and effect of the load on the one hand and the weight and overall size of the bearing itself on the other in bearings of this type. It is, however, the effect of uncontrolled forces on the bearing in particular that is to be minimized to the greatest extent possible, accordingly providing the bearing itself with greater resilience. The function of the bearing is also intended to be improved to the extent that no excessive stresses will occur even in extreme cases.

This object is attained in accordance with the invention in bearings with shaped-wire races of the aforesaid type by combining two in themselves known characteristics such as to obtain a combined effect. The first characteristic is that all points of contact between the shaped wires and the rolling components deviate from the rectilinear and surround one another. The second characteristic prescribes that the shaped wires are shaped and oriented such that the points of contact surround one another in such a way as to result in a four-point bearing in each of the rolling-component tracks.

Both of these characteristics of the invention are in themselves already disclosed, and actually in one publication—Swiss Pat. No. 555 012—although in two different contexts. The embodiments illustrated in FIGS. 1, 2, 5, and 6 are four-point bearings with rollers that have rectilinear surfaces as viewed in section and that are arranged crosswise. FIG. 3 illustrates a bearing of this type that, although the points of contact between its balls and tracks do deviate from the rectilinear in section, is in no way a four-point bearing. Finally, the embodiment illustrated in FIG. 4 combines both designs in two tracks, with a four-point bearing in one track due to the presence of rollers with a rectilinear surface and a two-point bearing 11 and points of contact that deviate from the rectilinear in the other track due to the presence of balls.

All of the embodiments have the drawbacks typical of such bearings. All the figures show that these bearings are rigid and unyielding and that the objective of maintaining them within certain limits of resilience would be absolutely impossible. First, the rolling-component cages in all embodiments prevent relative motion between the races. The rollers with the rectilinear surfaces are arranged crosswise, with the rollers at one angle of support being slightly shorter than those at the other. Subject to torsional forces the shorter rollers would shift position and provoke, along with the cages, stresses that would jam the bearing. Although the result is admittedly a multi-row four-point bearing in both tracks, the bearing would still be impractical for tank turrets for example because the turret would no longer be able to rotate in extreme situations.

A four-point bearing, however, is necessary if bearings with shaped-wire races have to be employed for reasons of weight and if high supporting and impact loads have to be overcome. This is part of the current awareness of anyone skilled in the art and is converted into practice in the ability to avoid stresses that were previously impossible to avoid. This is exemplified by the embodiments illustrated in FIGS. 3 and 4 of the previously cited publication, embodiments wherein the attempt is made to create such an annular bearing with shaped-wire races using balls. This bearing as well, however, is inherently absolutely rigid. Although the points of contact between the tracks and the balls in these embodiments deviate in section from the rectilinear, the only reason is to decrease the contact pressure between them.

Introducing a resilient layer between the the shaped wires and the races instead of embedding the wires rigidly in the races has accordingly been suggested. Although this approach would admittedly provide the bearing with a certain amount of resilience, it would also entail the drawback of creating a sort of sounding board, resulting in undesirable vibrations in both races.

No one of skill in the art, even the inventor of the bearing with shaped-wire races disclosed in Swiss Pat. No. 555 012 has previously been aware, even though the need has existed for decades, that a proper combination of the separate characteristics he discloses would provide a four-point bearing with more resilience.

The main goal of the invention—that of making a bearing with shaped-wire races more resilient—can be attained with either balls or rollers as rolling component. In either embodiment it is a good idea—in accordance with another characteristic of the invention—for every point of contact to be extensive enough to allow two radii per point of contact at an angle of support of approximately 90°. It is, however, also possible to position two shaped wires in one of the races, preferably the outer race, far enough apart for their angle of support to be as wide as 90°. It should be emphasized that only one shaped wire is necessary in the other race to allow adequate motion on the part of the bearing.

It is important to note in this context that the three-wire bearing disclosed in Swiss Pat. No. 555 012 certainly does not contribute to cutting down on the weight of the bearing. Comparison of the cross-sections of shaped wires 12 and 13 with that of the shaped wire 18 illustrated in FIG. 3 of this patent will make it unnecessary to calculate how much four wires with the cross-section of wires 12 and 13 would weigh. The use of three shaped wires does not accordingly have the significance attributed to it in relation to the principle behind the present patent.

The same design, however, does become significant in relation to the object of the invention because the extensive mutual overlap of the points of contact allows both resilience on the part of the bearing and a four-point bearing.

If an extensive range of torsion between the two races is to be attained, a correspondingly wider gap must be left between the two races in accordance with another characteristic of the invention, meaning that the width of the gap must be selected in accordance with the particular application. Simultaneously, the rolling-component cage must be positioned, again in accordance with the invention, where it can lie freely in the gap even when the bearing with shaped-wire races is in a limiting position.

In accordance with another characteristic of the invention the points of contact surround one another in individual potential embodiments to the extent that two angles of support occur. The result is two sections in one of the contact surfaces with radii that determine the angle of support. Although this means that the complete circumference of the rolling components will not rest against these sections of the contact surface, the result will be a definite two-point support for that track.

The basic principle of the invention can be embodied with rollers in two different versions. Thus, it is possible in a bearing with shaped-wire races with two shaped wires for rollers with a circular cross-section to be arranged crosswise. Two rollers should be positioned between three shaped wires with an outer surface that is concave in section in a three-wire bearing.

Figure 2:
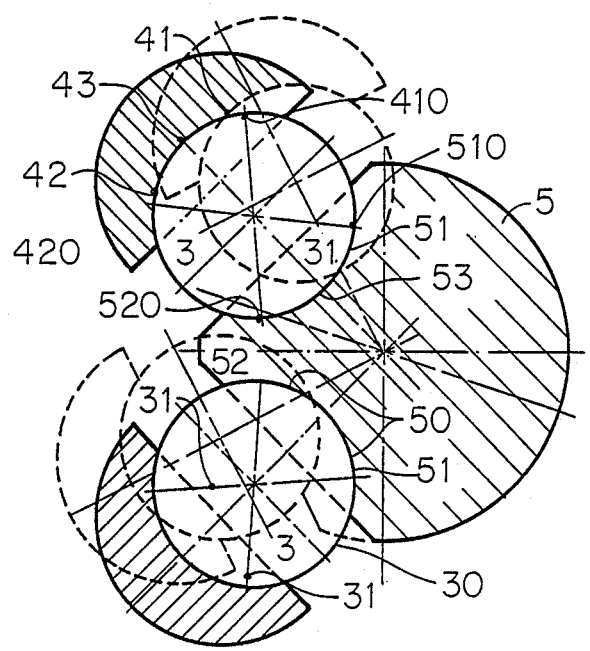
Figure 3:
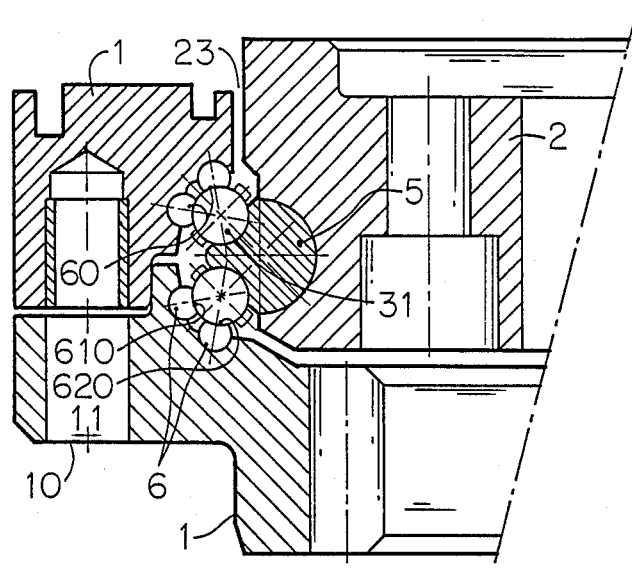
Figure 4:
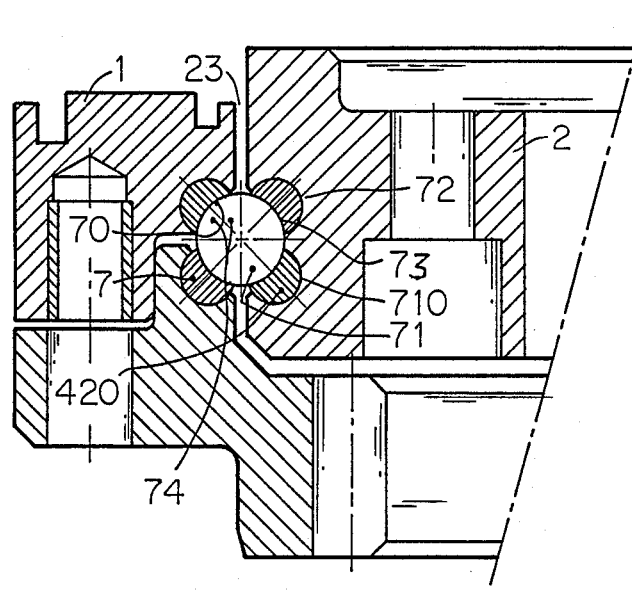
Figure 5:
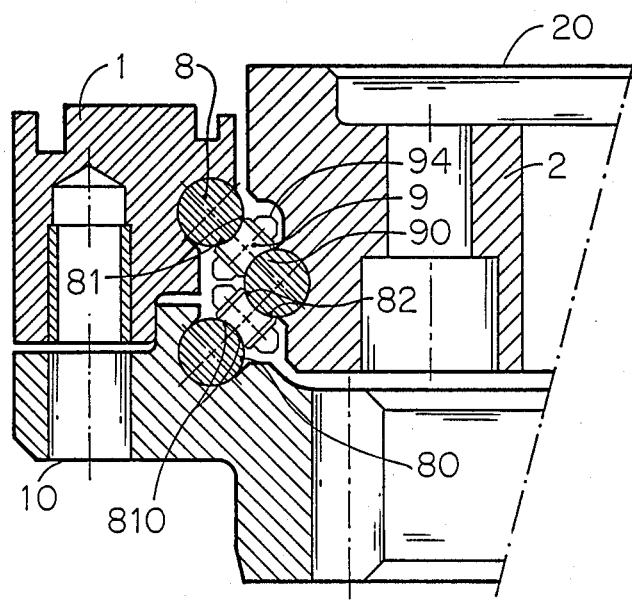

These and other characteristics of the invention will be evident from the claims and from various embodiments of the invention illustrated by way of example in the schematic drawings, wherein FIG. 1 illustrates a three-wire bearing with rolling components in the form of balls, FIG. 2 is a larger-scale detail thereof, showing the bearing in two limiting positions, FIG. 3 illustrates a similar bearing with five shaped wires, FIG. 4 shows a four-wire bearing with rollers, and FIG. 5 illustrates a three-wire bearing with rollers.

Although the outer race 1 is in two parts and the inner race 2 in one part in all the embodiments of the invention specified herein, these criteria are not essential to the invention. The supporting surface 10 of outer race 1 rests on the undercarriage of a vehicle, with which it interlocks in a way that is not illustrated. Bores 11 are distributed along the circumference of the bearing with shaped-wire races to connect the two race components together. Each component of race 1 has a cylindrical recess 12 that accommodates the shaped wires. These recesses can however also u- or v-shaped.

Inner race 2 is in one piece and has a supporting surface 20 that accommodates an unillustrated load. Bores 21 accommodate fasteners. A recess 22 for accommodating a shaped wire is provided at 21. A gap 23 is left to allow play between races 1 and 2. These components are the same in all the illustrated embodiments of the invention.

FIG. 1 illustrates an embodiment wherein rolling components in the form of balls 3 are provided in a three-wire bearing. To obtain a four-point bearing in this case two wires 4 are shaped to create a track 40 that is circular in cross-section and surrounds a considerable portion of the surface 30 of balls 3. Track 40 and the surface of the balls constitute the points of contact between both components of the bearing at outer race 1. Point 30 and 40 of contact extends far enough along the surface of the balls to exceed a sector demarcated by an angle, specifically far enough for the angle of support to simultaneously constitute the radius 31 of two arcs 41 and 42 of a circle. In the embodiment illustrated in FIGS. 1 through 3 the angle is approximately 90°, so that point 30 and 40 of contact extends over more than ⅛ of the surface of the balls and arcs 41 and 42 touch in the middle 43 of the race, where there is accordingly no contact with balls 3. Track 40 does not accordingly precisely match the shape of balls 3, but constitutes two points 410 and 420 of the particular four-point bearing.

Another shaped wire 5 that acts as a contact surface for both rows 3 of balls is introduced into inner race 2. It accordingly has two tracks 50 that are precisely identical and are accordingly represented by the same reference number for the sake of simplicity. Tracks 50 are, like tracks 40, divided into two halves 51 and 52 that constitute the two terminal points 510 and 520 of both four-point bearings.

FIG. 2 illustrates how the bearing with shaped-wire races can move back and forth between two limiting positions with no stresses of any type occurring. Since balls 3 can roll along the non-rectilinear points 30 and 40 of contact on the one hand and 30 and 50 on the other, both races have a 11 certain amount of play in relation to each other. They are in that position also not interfered with by cages 32, which, as will be evident from FIG. 1, are also unconstrained in their limiting positions.

All the parts illustrated in the two first figures are also part of the embodiment illustrated in FIG. 3, with the sole exception that two shaped wires 6 with two tracks 60 are employed instead of shaped wire 4. Tracks 60 are far enough apart for radii 31, which are oriented toward two points 610 and 620 on one side of the two four-point bearings with shaped-wire races, to describe an angle of approximately 90°. This bearing with shaped-wire races operates like the one illustrated in FIG. 2.

FIG. 4 illustrates a four-point shaped wire-race bearing that makes it possible to employ the principle of crossed-roller bearings in accordance with the invention. This embodiment of the invention necessitates four shaped wires 7 with tracks 70 to obtain a four-point bearing with shaped-wire races. The rollers in one row are labeled 71 and those in the other row, oriented at an angle of 180° to the first, are labeled 72 and their points of contact 720. Cages 73 are employed at 710. It is unnecessary to demonstrate that this is a four-point bearing with shaped-wire races.

The example illustrated in FIG. 5 has another type of roller in a bearing in accordance with the invention. This embodiment has three shaped wires 8 in the shape 80 and with the cross-section of a circle. Between them roll two rows 9 11 of rollers, each of which is provided with a cage 91. The rollers are positioned at an angle of approximately 90° to one another and have a concave outer surface 90 that also consists of two sections as illustrated in the magnified detail in FIG. 2, so that they need not be specified herein.

The discontinuous lines 81 show that the angle of compression is considerably more acute than that of the bearings with shaped-wire races illustrated in FIGS. 1 through 4.

All of the five embodiments specified herein employ the same basic principle of the invention—that of a double four-point bearing with shaped-wire aces wherein all mutual contact surface deviate from the rectilinear and that yields but not excessively and within the requisite limits at its limiting positions.

We claim:

1. An annular multi-row bearing with means defining shaped-wire races for sustaining axial and radial forces and moments of forces, comprising: an inner race and an outer race with corresponding tracks; a row of rolling elements between said inner race and said outer race; said races having a maximum of three shaped wires associated with each rolling element; tracks and areas of contact between the shaped wires and the rolling elements deviating from a straight line and surrounding one another, said tracks and areas of contact being arranged so that a four-point bearing is formed in each track, said races being able to deviate in position through pivoting of the row of roller elements with turning of the wire.

2. A multi-row bearing as defined in claim 1, wherein every area of contact supports an angle of substantialy 90°.

3. A multi-row bearing as defined in claim 1, wherein said areas of contact are sufficiently small and two shaped wires in at least one of said races are sufficiently far apart for forming an angle of support of substantially 90° to comprise thereby one side of a four-point bearing.

4. A multi-row bearing as defined in claim 1, wherein a gap is left between said races, said gap being sufficiently wide for allowing mutual torsion.

5. A multi-row bearing as defined in claim 4, wherein said rolling elements comprise cage-enclosed balls; and cages for enclosing said balls and lying freely in said gap independent of relative positions of said races with respect to each other.

6. A multi-row bearing as defined in claim 1, wherein at least one track comprises a shaped-wire track with a concave cross-section and ground down for producing two sections in shape of an arc of a circle with radii at an angle of substantially 90°.

7. Multi-row bearing with shaped-wire races as in claim 1, characterized in that the contours of both the race wires (4, 5, 7 and 8), which are concave and convex in section and which result in a four-point bearing, and of the rollers (3 and 9) completely surround one another but contact one another only for the most part.

8. Multi-row bearing with shaped-wire races as in claim 1, characterized in that the rollers (71 and 72) have a circular cross-section and are arranged crosswise.

9. Multi-row bearing with shaped-wire races as in claim 8, characterized in that the rollers (71 and 72) have a circular cross-section and are positioned in each of the two races (1 and 2) of every two shaped wires (4) with a matching contour to create a four-point bearing.

10. Multi-row bearing with shaped-wire races as in claim 1, characterized in that the rollers (71 and 72) have a seat (710) to accommodate a cage opposite their point of contact with the tracks.

11. Multi-row bearing with shaped-wire races as in claim 1, characterized in that the rollers (9) have a concave surface (90) and the shaped wires (8) have a matching contour.

12. Multi-row bearing with shaped-wire races as in claim 1, characterized in that the rollers (9) are positioned at an angle of approximately 90° to one another.

* * * * *